US011781602B2

(12) United States Patent
Damm et al.

(10) Patent No.: US 11,781,602 B2
(45) Date of Patent: Oct. 10, 2023

(54) MULTI-PLATE CLUTCH, ELECTRICALLY OPERATED DRIVE TRAIN AND METHOD FOR PRODUCING A MULTI-PLATE CLUTCH

(71) Applicant: HOERBIGER ANTRIEBSTECHNIK HOLDING GMBH, Schongau (DE)

(72) Inventors: Ansgar Damm, Schongau (DE); Sami Özkan, Schongau (DE); Jürgen Binder, Schongau (DE)

(73) Assignee: HOERBIGER ANTRIEBSTECHNIK HOLDING GMBH, Schongau (DE)

( * ) Notice: Subject to any disclaimer, the term of this patent is extended or adjusted under 35 U.S.C. 154(b) by 0 days.

(21) Appl. No.: 18/064,998

(22) Filed: Dec. 13, 2022

(65) Prior Publication Data
US 2023/0184299 A1     Jun. 15, 2023

(30) Foreign Application Priority Data
Dec. 13, 2021   (DE) ..................... 10 2021 006 131.4

(51) Int. Cl.
*F16D 13/52*     (2006.01)
*F16D 13/64*     (2006.01)

(52) U.S. Cl.
CPC ........... *F16D 13/52* (2013.01); *F16D 13/648* (2013.01)

(58) Field of Classification Search
CPC ...... F16D 13/52–13/565; F16D 13/648; F16D 13/683; F16D 25/0638; F16D 27/115; F16D 2021/0638; F16D 2021/0661; F16D 2021/0676; F16D 35/005; F16D 43/216; F16D 13/00–76; F16D 25/00–14
See application file for complete search history.

(56) References Cited

U.S. PATENT DOCUMENTS

| 2006/0243555 | A1* | 11/2006 | Lewis ..................... F16D 13/56 192/70.2 |
| 2017/0159721 | A1* | 6/2017 | Kalb ....................... F16D 13/52 |
| 2019/0293129 | A1* | 9/2019 | Nishinosono ....... F16D 25/0638 |

FOREIGN PATENT DOCUMENTS

WO    WO-2018192610 A1 * 10/2018

* cited by examiner

*Primary Examiner* — Ernesto A Suarez
*Assistant Examiner* — Lillian T Nguyen
(74) *Attorney, Agent, or Firm* — McNees Wallace & Nurick LLC

(57) ABSTRACT

A multi-plate clutch is specified, with an outer plate carrier, an inner plate carrier and a plate pack which consists of alternately arranged outer plates and inner plates and is arranged radially between the outer plate carrier and the inner plate carrier, wherein a first group of the outer plates is mounted on the outer plate carrier and/or a first group of the inner plates is mounted on the inner plate carrier with a larger circumferential backlash than the other outer plates or inner plates, respectively, which are mounted on their plate carrier with no or smaller circumferential backlash, wherein the outer and/or inner plates with larger circumferential backlash in each case directly adjoin at least one plate with no or smaller circumferential backlash. Furthermore, an electrically operated drive train and a method for producing a multi-plate clutch are specified.

10 Claims, 2 Drawing Sheets

MULTI-PLATE CLUTCH, ELECTRICALLY OPERATED DRIVE TRAIN AND METHOD FOR PRODUCING A MULTI-PLATE CLUTCH

TECHNICAL FIELD

The disclosure relates to a multi-plate clutch, an electrically operated drive train with a multi-plate clutch and a method for producing a multi-plate clutch.

BACKGROUND

Multi-plate clutches have several friction plates arranged axially one behind the other. They serve to limit a maximum torque, also called release torque, between a driven input shaft and an output shaft arranged coaxially relative to the input shaft. By limiting the torque within the multi-plate clutch, the components in a drive train can be protected against damage due to excessive increases in load.

The friction plates are usually preloaded against one another, for example by means of a spring element. The preloading sets the torque or frictional torque within the multi-plate clutch.

A problem here is that to some extent excessive increases in load occur very rarely, depending on the application, with the result that the multi-plate clutch is triggered very rarely. This means that a relative movement between the plates occurs only at relatively long intervals. Consequently, due to corrosion and adhesion, it can happen that the friction plates stick to one another and the tribological properties change. Due to the adhesion a maximum torque between the input shaft and the output shaft can also increase in the short term.

The object of the disclosure is therefore to provide a multi-plate clutch in which the tribological properties remain constant over a long period.

SUMMARY

This disclosure provides a multi-plate clutch with an outer plate carrier, an inner plate carrier and a plate pack which consists of alternately arranged outer plates and inner plates and is arranged radially between the outer plate carrier and the inner plate carrier, wherein a first group of the outer plates is mounted on the outer plate carrier and/or a first group of the inner plates is mounted on the inner plate carrier with a larger circumferential backlash than the other outer plates or inner plates, respectively, which are mounted on their plate carrier with no or smaller circumferential backlash, wherein the outer and/or inner plates with larger circumferential backlash in each case directly adjoin at least one plate with no or smaller circumferential backlash.

The outer plates of the first group and the inner plates of the first group differ in particular from the other outer plates or inner plates, respectively, in terms of their dimensioning. This means that the outer plates of the first group and the inner plates of the first group are designed differently in terms of their structure than the other outer plates or inner plates, respectively. In other words, the outer plates of the first group and the inner plates of the first group differ from the other outer plates or inner plates, respectively, not merely due to manufacturing tolerances.

The small circumferential backlash of the other outer plates or inner plates, respectively, can be set in a targeted manner or be due to manufacturing tolerances.

A multi-plate clutch according to the disclosure has the advantage that a relative movement between at least some of the plates also occurs below the release torque, as a result of which constant tribological properties are achieved over a long service life. More precisely, adhesion between the adjoining plates caused by corrosion, which is so strong that no relative movement between the plates occurs when the set maximum torque is exceeded, is prevented. Because a relative movement between at least some of the plates also occurs below the release torque, it is moreover achieved that, provided the plates are lubricated with oil, oil is distributed on the contact surfaces during a relative movement.

According to an embodiment the outer plates are interlocked with the outer plate carrier, wherein running along the inner wall of the outer plate carrier in the axial direction are grooves in which the teeth of the outer plates are received. The teeth of the outer plates, which are mounted with larger circumferential backlash, are narrower in the circumferential direction of the outer plate than the teeth of the other outer plates. The narrower teeth can move back and forth to a certain extent in the groove when the direction of rotation is changed, as a result of which a relative movement between outer plates of the first group and/or inner plates of the first group and plates adjoining them is achieved.

In the same way, the inner plates can be interlocked with the inner plate carrier, wherein running along the outer wall of the inner plate carrier in the axial direction are grooves in which the teeth of the inner plates are received, wherein the teeth of the inner plates, which are mounted with larger circumferential backlash, are narrower in the circumferential direction of the inner plate than the teeth of the other inner plates.

Preferably, at most two-thirds of the plates of the plate pack are mounted with a larger circumferential backlash than the other plates. In this way, a reliable transmission of the torque is guaranteed. In particular, immediately after a change of direction of rotation, a torque up to a level of the release torque can be transmitted.

The larger circumferential backlash is for example between 0.5° and 10°. Such a large circumferential backlash makes a sufficiently large relative movement possible, without causing excessive wear.

The friction surfaces of the outer plates and/or the inner plates can be structured. In particular, grooves can be present on the friction surfaces. A friction lining can consequently be dispensed with. The structuring, or the grooves, can serve to carry oil.

For example, the circumferential backlash corresponds to a spacing of the grooves in the circumferential direction. As a result, the friction surfaces are completely oiled during a relative movement.

In the case of a grid-shaped arrangement of the grooves, the spacing between the grooves in the circumferential direction is measured on the inside radius.

A preload force is applied to the plate pack, for example by means of a spring element. The preload force sets the torque or frictional torque within the friction plates.

The object is furthermore achieved according to the disclosure by an electrically operated drive train with an input shaft and an output shaft, an electric machine and a multi-plate clutch which is formed as described previously, wherein the input shaft and the output shaft are connected by the multi-plate clutch, and wherein the electric machine can be operated as a motor or as a generator. When switching from motor operation to generator operation, a relative movement occurs between the friction surfaces of the plates which are mounted with larger circumferential backlash and the friction surfaces of respectively adjoining plates. Due to the change of direction of rotation, the tooth flanks of the first group of the outer plates and/or of the first group of the inner plates "shift". More precisely, with each change of direction of rotation a relative movement takes place between a plate of the first group of outer plates and/or of a first group of inner plates and a directly adjoining plate. As a result, the plates are regularly moved relative to one another, with the result that excessive adhesion is prevented.

The object is in addition achieved according to the disclosure by a method for producing a multi-plate clutch as described previously, wherein a first group and at least one second group of outer plates are provided which differ in terms of their dimensioning such that the outer plates of the first group are provided with a larger circumferential backlash relative to the outer plate carrier than the second group of outer plates, and wherein inner plates are provided which have a smaller circumferential backlash than the first group of outer plates. Alternatively or additionally, a first group and at least one second group of inner plates are provided which differ in terms of their dimensioning such that the inner plates of the first group are provided with a larger circumferential backlash relative to the inner plate carrier than the second group of inner plates, and wherein outer plates are provided which have a smaller circumferential backlash than the first group of inner plates. In both alternatives, the plates of the first group are arranged on their assigned outer or inner plate carrier such that at least one of their directly adjoining plates has a smaller circumferential backlash than them.

The plates directly adjoining plates of the first group can be plates of the second group of the respectively different type of plate or the plates of the different type always provided with smaller circumferential backlash in any case.

In particular, the plates of the first group differ from the plates of the same type of the second group in terms of their dimensioning, which is chosen in the design taking into account manufacturing tolerances.

DETAILED DESCRIPTION

Figure 1:
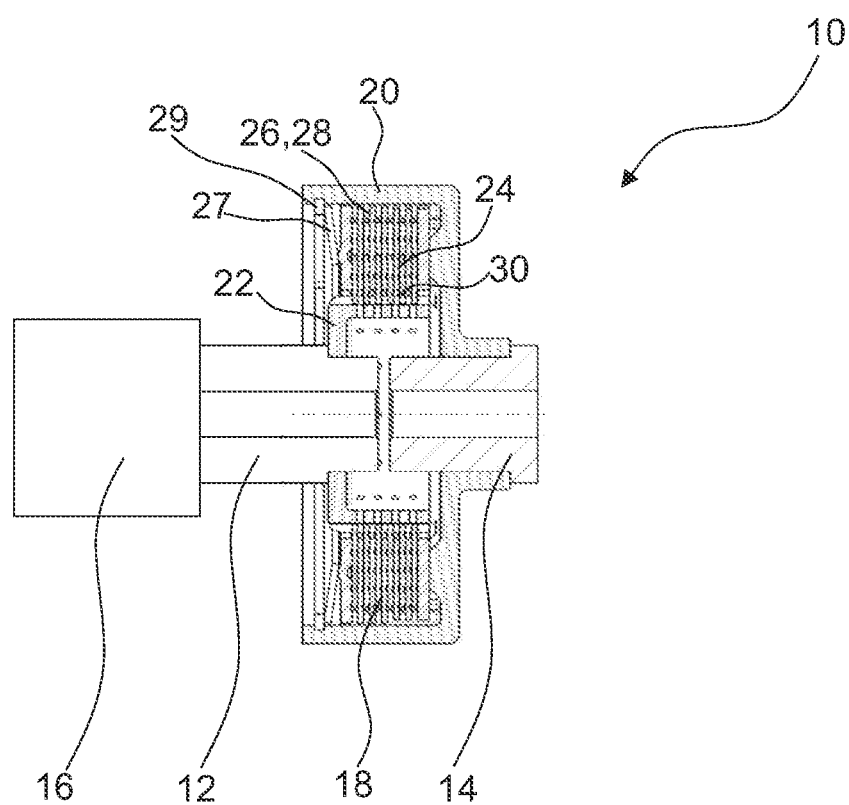
FIG. 1 an electric drive train according to the disclosure,
FIG. 2 a multi-plate clutch according to the disclosure in an exploded representation,
FIG. 3 part of a plate pack of a multi-plate clutch according to the disclosure, and
FIG. 4 a cross section through a multi-plate clutch according to the disclosure.

FIG. 1 shows, partially schematically, an electrically operated drive train 10 in a sectional representation.

The electrically operated drive train 10 comprises an input shaft 12 and an output shaft 14, which is arranged coaxially relative to the input shaft 12, as well as an electric machine 16.

The electric machine 16 can be operated as a motor or as a generator.

The electric machine 16 drives the input shaft 12 of the drive train 10.

The output shaft 14 serves for example to drive a drive shaft or an input shaft of a gearbox.

The input shaft 12 and the output shaft 14 are connected by a multi-plate clutch 18 for the transmission of a torque.

Figure 2:
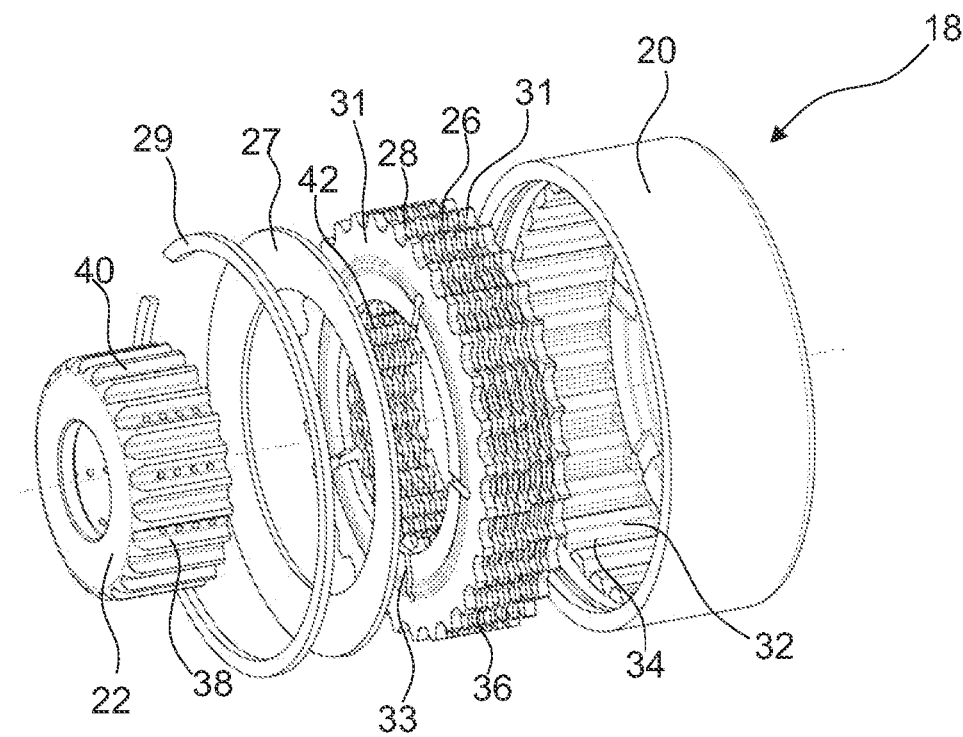

FIG. 2 shows the multi-plate clutch 18 in an exploded representation.

The multi-plate clutch 18 serves to limit the maximum transmissible torque between the input shaft 12 and the output shaft 14. By limiting the torque, the components of the drive train 10 are protected against damage caused by an excessive increase in load.

The multi-plate clutch 18 comprises several friction plates which are in particular made of steel and are arranged axially one behind the other.

More precisely, the multi-plate clutch 18 comprises an outer plate carrier 20 and an inner plate carrier 22 as well as a plate pack 24 arranged radially between the outer plate carrier 20 and the inner plate carrier 22.

The plate pack 24 has alternately arranged outer plates 26, 28 and inner plates 30.

The outer plate carrier 20 is formed pot-shaped and forms a housing of the multi-plate clutch 18, in which the plate pack 24 is housed.

In the embodiment example, the outer plate carrier 20 is connected to the output shaft 14 in a rotationally fixed manner.

In the embodiment example, the inner plate carrier 22 is connected to the input shaft 12 in a rotationally fixed manner.

A preload force is applied to the plate pack 24 by means of a spring element 27. The preload force produces a friction-locking connection between the input shaft 12 and the output shaft 14. In particular, the preload force determines the torque or frictional torque within the plate pack 24. In the embodiment example, the spring element 27 is a disc spring.

The preloaded spring element 27 is supported in the outer plate carrier 20 via an axial retaining ring 29 and optionally a shim ring (not represented).

The final plates 31 on the end faces of the plate pack 24 are preferably formed thicker than the other plates 26, 28, 30. This serves to distribute the preload forces uniformly on the friction surfaces within the plate pack 24.

In order that the final plates 31 do not unintentionally deform under thermal load, they can have several recesses, in particular slots 33, distributed on the circumference.

The outer plates 26, 28 are interlocked with the outer plate carrier 20. The inner plates 30 are interlocked with the inner plate carrier 22.

For this purpose, running along an inner wall 32 of the outer plate carrier 20 in the axial direction are grooves 34 in which the teeth 36 of the outer plates 26, 28 are received.

Equally, running along an outer wall 38 of the inner plate carrier 22 in the axial direction are grooves 40 in which the teeth 42 of the inner plates 30 are received.

If the maximum transmissible torque is exceeded, the outer plates 26, 28 coupled to the outer plate carrier 20 can twist relative to the inner plates 30 connected to the inner plate carrier 22. A rotational speed difference between the two shafts 12, 14 is thereby possible for a short time. The resulting frictional torque between the friction plates reduces this rotational speed difference again if the torque drops below the maximum transmissible torque and restores the parity of the rotational speeds of the shafts. The coupling is thus also capable of damping brief impacts or vibrations in the drive train, which lie above the maximum transmissible torque of the multi-plate clutch 18.

Figure 3:
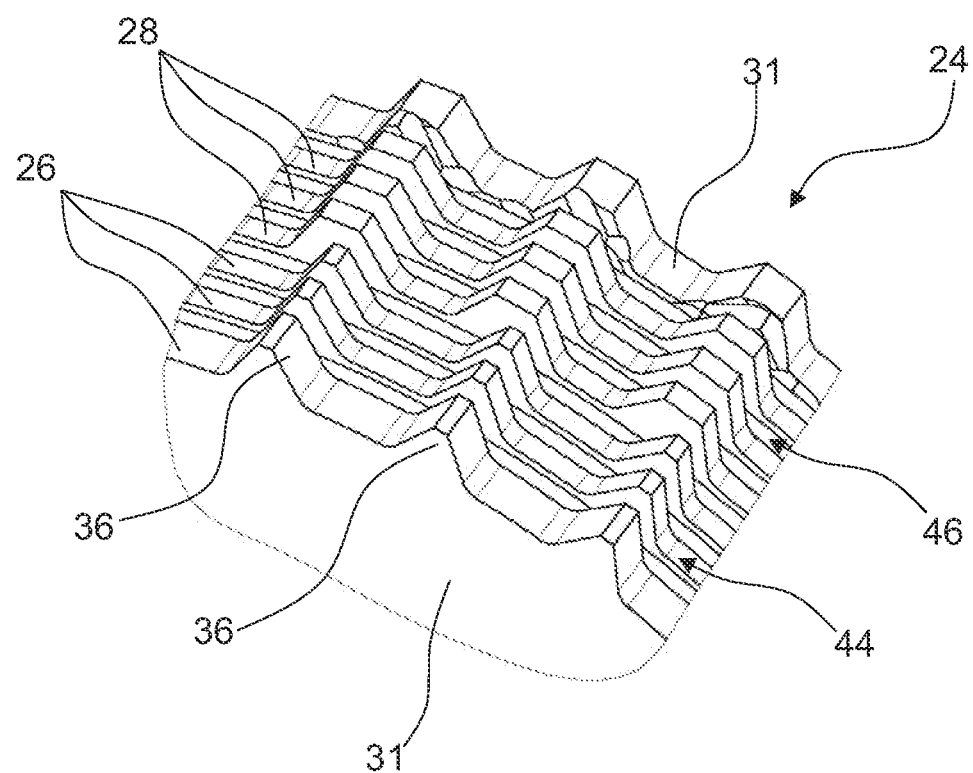

In the embodiment example, the outer plates 26, 28 are divided into two groups 44, 46, wherein the outer plates 26 of the first group 44 differ from the other outer plates 28 of the further group 46 in terms of their dimensioning. This can be seen particularly clearly in FIG. 3, which shows a detail view of the plate pack 24.

More precisely, the outer plates 26 of the first group 44 are mounted on the outer plate carrier 20 with a larger circumferential backlash than the other outer plates 28 of the second group 46.

This is achieved by the fact that the teeth 36 of the outer plates 26 of the first group 44 are narrower in the circumferential direction of the outer plate 26 than the teeth 36 of the outer plates 28 of the second group 46, while the grooves 34 preferably have a universally constant profile.

The circumferential backlash of the outer plates 26 of the first group 44 relative to the outer plate carrier 20 is for example between 0.5° and 10°, in particular between 1° and 5°.

The outer plates 28 of the second group 46 are mounted on the outer plate carrier 20 with no or smaller circumferential backlash than the outer plates 26 of the first group 44.

A rotationally fixed mounting is in particular achieved by receiving the teeth 36 of the outer plates 28 in the grooves 34 in positive-locking manner.

Optionally, at least one further group of outer plates 28 can be provided, which differ from the outer plates 26 of the first group 44 and the outer plates 28 of the second group 46 in terms of their dimensioning.

In the embodiment example, all inner plates 30 are mounted on the inner plate carrier 22 with no circumferential backlash or with a smaller circumferential backlash than the outer plates 26 of the first group 44. The desired circumferential backlash is likewise achieved by a corresponding design of the teeth 42 of the inner plates 30 and of the grooves 40 of the inner plate carrier 22.

This means that the outer plates 26 with larger circumferential backlash in each case directly adjoin an inner plate 30 with no or smaller circumferential backlash.

In order to achieve a particularly good friction behaviour, the friction surfaces of the outer plates 26, 28 and/or the inner plates 30 are structured. For example, grooves 50 are present on the friction surfaces, as can be seen in the sectional representation in FIG. 4. Alternatively, it is also conceivable that the friction surfaces are chemically and/or mechanically and/or thermally treated in order to produce a defined surface roughness.

Due to the structuring, a friction lining can be dispensed with.

If the plate pack 24 is lubricated with oil, the structuring serves to distribute the oil evenly across the outer plates 26, 28 and inner plates 30. To supply the oil, it is sufficient for the outer plates 26, 28 and/or the inner plates 30 to be structured on one side.

In the embodiment example, the circumferential backlash of the outer plates 26 of the first group 44 is smaller than the spacing of the grooves 50 in the circumferential direction of the plates.

In order to achieve a particularly extensive oil lubrication of the plates, it is advantageous if the circumferential backlash of the outer plates 26 of the first group 44 corresponds to the spacing of the grooves 50 in the circumferential direction of the plates, wherein the spacing is in particular measured on an inner circumference of the outer plates 26, 28.

Figure 4:
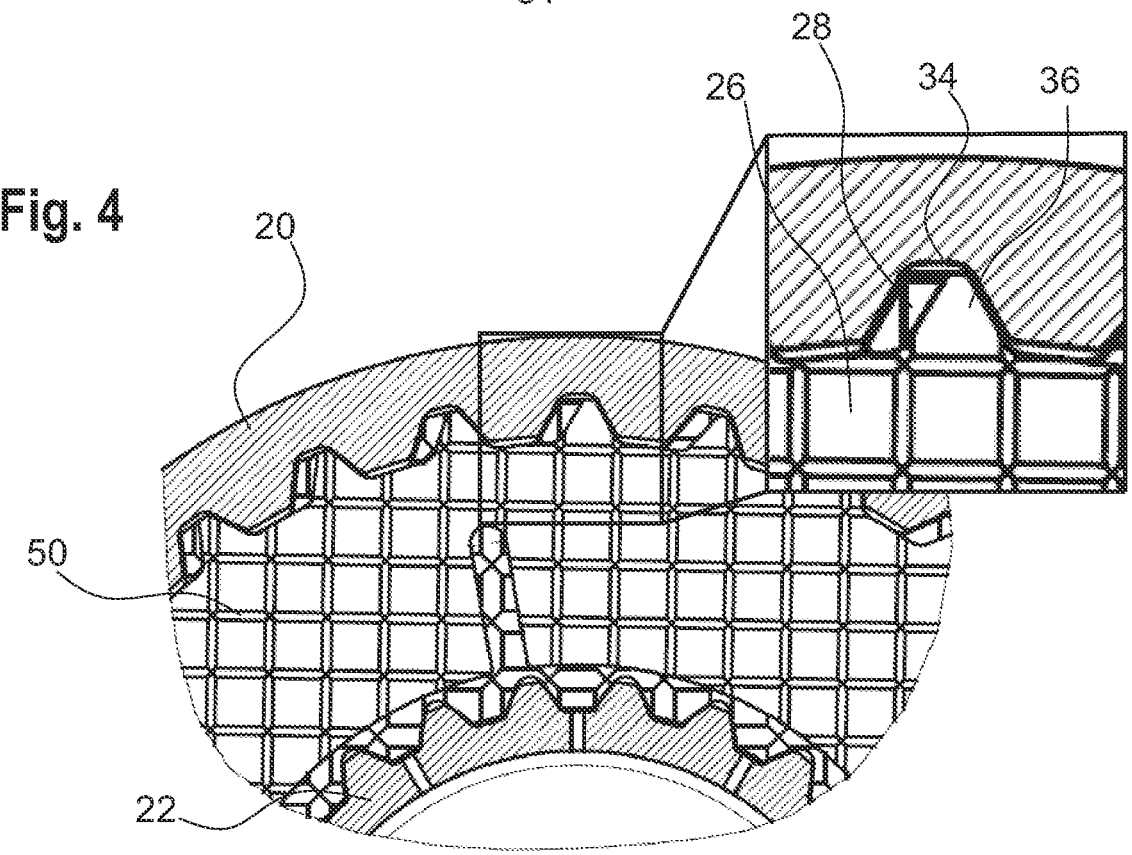

The arrangement of the teeth 36 of the outer plates 26, 28 in the grooves 34 of the outer plate carrier 20 can be seen in FIG. 4, wherein, in the representation in FIG. 4, an outer plate 26 of the first group 44 is arranged in front of an outer plate 28 of the second group 46.

In operation, because of the circumferential backlash according to the disclosure of the outer plates 26, when switching the electric machine 16 from motor operation to generator operation a relative movement can occur between the friction surfaces of the outer plates 26 of the first group 44, which are mounted with larger circumferential backlash, and the friction surfaces of respectively adjoining inner plates 30. Due to the change of direction of rotation, the tooth flanks of the teeth 36 in particular "shift".

This means that in the case of a change of direction of the torque, the outer plates 26 of the first group 44 can twist relative to the outer plate carrier 20, until the flanks of the teeth 36 have aligned themselves again on an opposite side of the groove 34.

However, the outer plates 28 of the second group 46 ensure a direct torque transmission due to the smaller or no circumferential backlash.

In other words, the outer plates 26 of the first group 44 stop briefly in the case of a change of direction of rotation. This results in a relative movement between the outer plates 26 of the first group 44 and the respectively adjoining inner plates 30, which do not stop or stop for an even shorter time due to the smaller circumferential backlash.

According to the disclosure, this results, with each change of direction of rotation, in a relative movement by the amount of the circumferential backlash difference at least between the outer plates 26 of the first group 44 and the adjoining inner plates 30. In this way, a possible adhesion is cancelled out and the tribological properties of the friction surfaces are retained in the long term.

Due to the relative movement, fresh oil is in addition conveyed between the friction surfaces by the structured surface of the plates.

The momentum when the tooth flanks hit the opposite side of the groove 34 also results in a small movement within all friction surfaces of the multi-plate clutch 18. A possible adhesion between all outer and inner plates 26, 28, 30 is thus cancelled out, even if they are mounted with a small or no circumferential backlash.

If all tooth flanks are aligned, the multi-plate clutch 18 can transmit the defined maximum torque.

In a further embodiment, which is not described in the figures for the sake of simplicity, instead of the outer plates the inner plates 30 can be divided into at least two groups, wherein the inner plates of the first group differ from the inner plates of the at least one further group in terms of their dimensioning.

In a further alternative embodiment, both a first group of outer plates and a first group of inner plates can be mounted with a larger circumferential backlash than the other outer plates or inner plates, respectively. In this case, the outer and inner plates with larger circumferential backlash in each case directly adjoin at least one plate with no or smaller circumferential backlash.

Preferably, at most two-thirds of the plates 26, 28, 30 of the plate pack 24 are mounted with a larger circumferential backlash than the other plates.

During the production of the multi-plate clutch 18, after the provision of at least the first group 44 and the second group 46 of outer plates 26, 28, the plates 26 of the first group 44 are arranged on their assigned outer plate carrier 20 such that at least one of their directly adjoining inner plates 30 has a smaller circumferential backlash than them.

Alternatively or additionally, a first group and at least one second group of inner plates can be provided which differ in terms of their dimensioning such that the inner plates of the first group are provided with a larger circumferential backlash relative to the inner plate carrier 22 than the second group of inner plates.

The inner plates 30 and outer plates 26, 28 are arranged on the respectively assigned inner plate carrier 22 or outer plate carrier 20 such that the plates of the first group, which are in each case provided with a larger circumferential backlash than the other plates of the same type, directly adjoin a plate which has a smaller circumferential backlash than them.

The invention claimed is:

1. A multi-plate clutch comprising:
an outer plate carrier,
an inner plate carrier, and
a plate pack which comprises alternately arranged outer plates and inner plates and is arranged radially between the outer plate carrier and the inner plate carrier,
wherein a first group of the inner plates is mounted on the inner plate carrier with a larger circumferential backlash than other inner plates, respectively, which are mounted on their plate carrier with no or smaller circumferential backlash,
wherein the inner plates with larger circumferential backlash in each case directly adjoin at least one plate with no or smaller circumferential backlash, and
wherein the inner plates are interlocked with the inner plate carrier, wherein running along an outer wall of the inner plate carrier in the axial direction are grooves in which teeth of the inner plates are received, wherein the teeth of the inner plates, which are mounted with larger circumferential backlash, are narrower in the circumferential direction of the inner plate than teeth of the other inner plates.

2. The multi-plate clutch according to claim 1, wherein at most two-thirds of the plates of the plate pack are mounted with the larger circumferential backlash than the other plates.

3. The multi-plate clutch according to claim 1, wherein the larger circumferential backlash is between 0.5° and 10°.

4. The multi-plate clutch according to claim 1, wherein the friction surfaces of the outer plates and/or the inner plates are structured.

5. The multi-plate clutch according to claim 4, wherein grooves are present on the friction surfaces.

6. The multi-plate clutch according to claim 4, wherein the circumferential backlash corresponds to a spacing of the grooves in the circumferential direction.

7. The multi-plate clutch according to claim 1, wherein a preload force is applied to the plate pack by a spring element.

8. An electrically operated drive train with an input shaft and an output shaft, an electric machine and the multi-plate clutch according to claim 1, wherein the input shaft and the output shaft are connected by the multi-plate clutch, and wherein the electric machine can be operated as a motor or as a generator, wherein, when switching from motor operation to generator operation, a relative movement occurs between friction surfaces of the plates which are mounted with larger circumferential backlash and friction surfaces of respectively adjoining plates.

9. A method for producing the multi-plate clutch according to claim 1, wherein the first group and at least one second group of outer plates are provided which differ in terms of their dimensioning such that the outer plates of the first group are provided with the larger circumferential backlash relative to the outer plate carrier than the second group of outer plates, and wherein inner plates are provided which have a smaller circumferential backlash than the first group of outer plates, and/or
in that the first group and at least one second group of inner plates are provided which differ in terms of their dimensioning such that the inner plates of the first group are provided with the larger circumferential backlash relative to the inner plate carrier than the second group of inner plates, and wherein outer plates are provided which have the smaller circumferential backlash than the first group of inner plates,
wherein the method comprises the step of arranging the plates of the first group on an outer or inner plate carrier assigned to the first group of plates such that at least one of the plates directly adjoining a plate of the first group has a smaller circumferential backlash than the plates of the first group.

10. A multi-plate clutch comprising:
an outer plate carrier,
an inner plate carrier, and
a plate pack which comprises alternately arranged outer plates and inner plates and is arranged radially between the outer plate carrier and the inner plate carrier,
wherein a first group of the outer plates is mounted on the outer plate carrier and/or a first group of the inner plates is mounted on the inner plate carrier with a larger circumferential backlash than other outer plates or inner plates, respectively, which are mounted on their plate carrier with no or smaller circumferential backlash,
wherein the outer and/or inner plates with larger circumferential backlash in each case directly adjoin at least one plate with no or smaller circumferential backlash,
wherein the friction surfaces of the outer plates and/or the inner plates are structured, and
wherein the circumferential backlash corresponds to a spacing of the grooves in the circumferential direction.

* * * * *